United States Patent
Li et al.

(10) Patent No.: US 9,800,563 B2
(45) Date of Patent: Oct. 24, 2017

(54) METHOD AND DEVICE FOR PROCESSING DATA SECURITY CHANNEL

(71) Applicant: Huawei Technologies Co., Ltd., Shenzhen, Guangdong (CN)

(72) Inventors: Huan Li, Shanghai (CN); Shufeng Shi, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 131 days.

(21) Appl. No.: 14/269,965

(22) Filed: May 5, 2014

(65) Prior Publication Data

US 2014/0245403 A1 Aug. 28, 2014

Related U.S. Application Data

(63) Continuation of application No. PCT/CN2011/081738, filed on Nov. 3, 2011.

(51) Int. Cl.
*H04L 29/06* (2006.01)
*H04L 12/66* (2006.01)
(Continued)

(52) U.S. Cl.
CPC .......... *H04L 63/08* (2013.01); *H04L 12/6418* (2013.01); *H04L 12/66* (2013.01);
(Continued)

(58) Field of Classification Search
CPC ... H04L 63/101; H04L 63/083; H04L 63/105; H04L 63/0884; H04L 63/0892;
(Continued)

(56) References Cited

U.S. PATENT DOCUMENTS

2010/0040024 A1* 2/2010 Wu .................. H04L 63/0892
370/331
2010/0199332 A1 8/2010 Bachmann et al.
(Continued)

FOREIGN PATENT DOCUMENTS

CN 101106812 A 1/2008
CN 101316205 A 12/2008
(Continued)

OTHER PUBLICATIONS

C. Kaufman, P. Hoffman, Y. Nir, P. Eronen, "Internet Key Exchange Protocol Version 2 (IKEv2)", Sep. 2010, Internet Engineering Task Force IETF, RFC 5996, pp. 1-138.*
(Continued)

*Primary Examiner* — Edward Zee
*Assistant Examiner* — Chi Nguy
(74) *Attorney, Agent, or Firm* — Leydig, Voit & Mayer, Ltd.

(57) ABSTRACT

Embodiments of the present invention provide a method and a device for processing a data security channel of a tunnel, where the method includes: receiving an authentication and authorization request of an access side, and determining a trust relationship of access of a user equipment; and when an S6b interface session of the user equipment exists, sending a message including information about the trust relationship of the access of the user equipment to a packet data gateway, so that the packet data gateway establishes or updates a data security channel of an S2c tunnel according to the information about the trust relationship.

16 Claims, 7 Drawing Sheets

(51) Int. Cl.
*H04W 12/02* (2009.01)
*H04L 12/64* (2006.01)
*H04W 12/06* (2009.01)

(52) U.S. Cl.
CPC ......... *H04L 63/0892* (2013.01); *H04W 12/02* (2013.01); *H04L 63/0272* (2013.01); *H04W 12/06* (2013.01)

(58) Field of Classification Search
CPC . H04L 63/0236; H04L 63/0485; H04L 63/08; H04L 63/0876; G06F 21/30; G06F 21/31; G06F 21/46
USPC ................................................ 726/17–19, 27
See application file for complete search history.

(56) References Cited

U.S. PATENT DOCUMENTS

| 2011/0026435 A1* | 2/2011 | Weniger | H04W 8/065 370/254 |
| 2011/0225632 A1* | 9/2011 | Ropolyi | H04W 48/16 726/4 |
| 2014/0245403 A1 | 8/2014 | Li et al. | |

FOREIGN PATENT DOCUMENTS

| JP | 2010530680 A | 9/2010 |
| JP | 5922785 B2 | 5/2016 |
| WO | WO 2010076044 A1 | 7/2010 |
| WO | WO 2011104149 A1 | 9/2011 |
| WO | WO 2012060123 A1 | 5/2012 |

OTHER PUBLICATIONS

3GPP TS 29.273 V9.2.0 (Mar. 2010) Technical Specification, 3rd Generation Partnership Project; Technical Specification Group Core Network and Terminals; Evolved Packet System (EPS); 3GPP EPS AAA interfaces (Release 9), pp. 1-107.*

"Correction on Trust Relationship Indication," 3GPP TSG-CT4 Meeting #54, St. Julians, Malta, C4-112229, 3$^{rd}$ Generation Partnership Project, Valbonne, France (Aug. 22-26, 2011).

"3$^{rd}$ Generation Partnership Project; Technical Specification Group Core Network and Terminals; Evolved Packet System (EPS); 3GPP EPS AAA interfaces (Release 10)," 3GPP TS 29.273, V10.3.0, pp. 1-116, 3$^{rd}$ Generation Partnership Project, Valbonne, France (Jun. 2011).

"3$^{rd}$ Generation Partnership Project; Technical Specification Group Services and System Aspects; Architecture enhancements for non-3GPP accesses (Release 11)," 3GPP TS 23.402, V11.0.0, pp. 1-232, 3$^{rd}$ Generation Partnership Project, Valbonne, France (Sep. 2011).

"3$^{rd}$ Generation Partnership Project; Technical Specification Group Core Network and Terminals; Mobility management based on Dual-Stack Mobile IPv6; Stage 3 (Release 11)," 3GPP TS 24.303, V11.0.0, pp. 1-52, 3$^{rd}$ Generation Partnership Project, Valbonne, France (Sep. 2011).

"3$^{rd}$ Generation Partnership Project; Technical Specification Group Core Network and Terminals; Evolved Packet System (EPS); 3GPP EPS AAA interfaces (Release 9)," 3GPP TS 29.273, V9.2.0, pp. 1-107, 3$^{rd}$ Generation Partnership Project, Valbonne, France (Mar. 2010).

"3$^{rd}$ Generation Partnership Project; Technical Specification Group Core Network and Terminals; Evolved Packet System (EPS); 3GPP EPS AAA Interfaces (Release 9)," 3GPP TS 29.273, V9.7.0, pp. 1-8; 13-14; 22-25; 85-88; 103, 3$^{rd}$ Generation Partnership Project, Valbonne, France (Jun. 2011).

Kaufman, "Internet Key Exchange (IKEv2) Protocol," Network Working Group, Request for Comments: 4306, pp. 1-99, Internet Society, Reston, Virginia (Dec. 2005).

"Universal Mobile Telecommunications Systems (UMTS); LTE; Architecture enhancements for non-3GPP accesses (3GPP TS 23.402 version 10.5.0 Release 10)," ETSI TS 123.402, V10.5.0, pp. 1-234, 3rd Generation Partnership Project, Valbonne, France (Oct. 2011).

"Universal Mobile Telecommunications System (UMTS); LTE; Evolved Packet System (EPS); 3GPP EPS AAA interfaces (3GPP TS 29.273 version 10.6.0 Release 10)," ETSI TS 129 273, V10.6.0, pp. 1-118, 3rd Generation Partnership Project, Valbonne, France (Jul. 2012).

"Correction on Trust Relationship Indication," 3GPP TSG CT WG4 Meeting #55, San Francisco, California, C4-112634, 3$^{rd}$ Generation Partnership Project, Valbonne, France (Nov. 14-18, 2011).

* cited by examiner

METHOD AND DEVICE FOR PROCESSING DATA SECURITY CHANNEL

CROSS-REFERENCE TO RELATED APPLICATIONS

This application is a continuation of International Patent Application No. PCT/CN2011/081738, filed on Nov. 3, 2011, which is hereby incorporated by reference in its entirety.

TECHNICAL FIELD

Embodiments of the present invention relate to the field of communications technologies, and in particular, to a method and a device for processing a data security channel.

BACKGROUND

With the coming of a mobile broadband era, users need to use broadband access services anywhere and anytime, which raises higher requirements, such as a higher transmission rate, smaller delay, and higher system capacity, for a mobile communications network. To maintain the advantages of 3GPP networks, the 3GPP standards organization launched research and standardization work of an SAE (system architecture evolution) plan and defined a new mobile communications network framework that is referred to as an evolved packet system EPS (evolved packet system) at the end of 2004. With the trend of convergence and unification of core networks, the 3GPP also provides a possibility of access to a core network EPC (Evolved Packet Core, core part of the evolved packet system) of the EPS system by using a non-3GPP access network, for example, WLAN, WiMAX, and the like, to access the EPC.

An S2c interface uses the DSMIPv6 (Dual Stack Mobile IPv6) protocol and can be used to access an EPS network by using a trusted non-3GPP access network, an untrusted non-3GPP access network, or a 3GPP access network. When a UE (user equipment) accesses the EPC by using a non-3GPP access network via the S2c interface, an SA (security association) is established between the UE and a PDN-GW (packet data gateway, also PGW for short) to protect DSMIPv6 signaling. When the UE accesses the EPC via the S2c interface, the PDN-GW transmits authentication and authorization request and response messages via an S6b interface between the PDN-GW and an AAA (authentication, authorization and accounting) server, so that the PDN-GW completes authentication and authorization for the UE and obtains information such as a mobility parameter and subscription data from the AAA server. Certainly, in a roaming scenario, an AAA agent further needs to be passed between the PDN-GW and the AAA server.

When the UE accesses the EPC by using a trusted non-3GPP access network via the S2c interface, the 3GPP defines that after a DSMIPv6 tunnel is established between the UE and the PDN-GW, a security association SA is established between the UE and the PDN-GW to protect DSMIPv6 signaling, and the PDN-GW may initiate establishment of a child security association Child SA (child security association) to the UE to protect a data plane; however, when the UE accesses the EPC by using an untrusted non-3GPP access network, an IPSec security channel is established between the UE and a non-3GPP access gateway ePDG (evolved packet data gateway), and security protection is performed for a data packet between the UE and the PDN-GW by using the IPSec security channel. That is, when the UE accesses the EPS by using a non-3GPP network in a trusted manner, a child SA may be established on an S2c tunnel to protect integrity and confidentiality of the data plane; when the UE accesses the EPS by using a non-3GPP network in an untrusted manner, the IPSec security channel between the UE and the ePDG provides integrity protection and confidentiality protection for data; and when the UE accesses the EPC by using a 3GPP access network via the S2c interface, data security protection between the UE and the PDN-GW is provided by using an authentication encryption mechanism of the 3GPP itself. Therefore, when the UE accesses the EPC via the S2c interface, the PDN-GW needs to distinguish whether an access scenario is access by using a trusted non-3GPP access network, access by using an untrusted non-3GPP access network, or access by using a 3GPP access network, and completes an establishment or update procedure of a different data security channel.

When the UE accesses the EPC by using a 3GPP access network, a security association SA may be first established between the UE and the PDN-GW, so as to save time for SA establishment after a subsequent handover to access by using a non-3GPP access network. When the UE hands over from the non-3GPP access network to a 3GPP access network, the security association SA between the UE and the PDN-GW may also not be released immediately; instead, the SA is retained for a period of time and is automatically released in the case of an SA timeout. In this case, when the UE hands over between a trusted non-3GPP access network, an untrusted non-3GPP access network, and a 3GPP access network and accesses the EPC via the S2c interface, an SA may already exist; however, a trust relationship of an access network obtained by the PDN-GW at that time during previous SA establishment, that is, information about whether the access network at that time is trusted or untrusted non-3GPP access or 3GPP access, may not be consistent with a trust relationship of a current access network. Therefore, a data security channel needs to be established or updated according to an access scenario after a handover.

As described above, when the UE hands over between a trusted non-3GPP access network, a 3GPP access network, and an untrusted non-3GPP access network and accesses the EPC via the S2c interface, the PDN-GW needs to distinguish an access scenario, so as to complete establishment or update of a data security channel in a different manner. However, the PDN-GW cannot determine a current access manner of the UE and therefore cannot correctly establish or update the data security channel.

SUMMARY

Embodiments of the present invention provide a method and a device for processing a data security channel of a tunnel, which can ensure correct establishment or update of a data security channel of an S2c tunnel.

According to one aspect, a method for processing a data security channel of a tunnel is provided, including: receiving an authentication and authorization request of an access side, and determining a trust relationship of access of a user equipment; and when an S6b interface session of the user equipment exists, sending a message including information about the trust relationship to a packet data gateway, so that the packet data gateway establishes or updates a data security channel of an S2c tunnel according to the information about the trust relationship.

According to another aspect, a method for processing a data security channel of a tunnel is provided, including: receiving a packet data network connection establishment request of a user equipment; when an S6b interface session of the user equipment exists or there already is a security association with the user equipment, sending an authorization request message to an authentication and authorization device; receiving an authorization response message sent by the authentication and authorization device, where the authorization response message includes information about a trust relationship of access of the user equipment; and establishing or updating a data security channel of an S2c tunnel according to the information about the trust relationship.

According to another aspect, an authentication and authorization device is provided, including: a receiving unit, configured to receive an authentication and authorization request of an access side; an authentication unit, configured to authenticate the authentication and authorization request, determine a trust relationship of access of a user equipment, and when an S6b session of the user equipment exists, instruct a sending unit to send a message including information about the trust relationship to a packet data gateway; and the sending unit, configured to send the message to the packet data gateway, where the message includes the information about the trust relationship.

According to another aspect, a gateway device is provided, including: a receiving unit, configured to receive a packet data network connection establishment request of a user equipment, and configured to receive an authorization response message sent by an authentication and authorization device, where the authorization response message includes information about a trust relationship of access of the user equipment; a confirming unit, configured to, when the receiving unit receives the packet data network connection establishment request, confirm that if an S6b session of the user equipment exists or that there already is a security association with the user equipment, and then instruct a sending unit to send an authorization request message to the authentication and authorization device; the sending unit, configured to send the authorization request message to the authentication and authorization device; and an establishing unit, configured to establish or update a data security channel of an S2c tunnel according to the information about the trust relationship.

In the embodiments of the present invention, when a UE accesses an EPC via an S2c interface, an authentication and authorization device sends a message including information about a trust relationship of access of a user equipment, or includes the information about the trust relationship of the access of the user equipment in an authorization response message; and a gateway device establishes or updates a data security channel according to the information about the trust relationship included in the message, so as to ensure correct establishment of the data security channel.

BRIEF DESCRIPTION OF DRAWINGS

To describe the technical solutions in the embodiments of the present invention more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
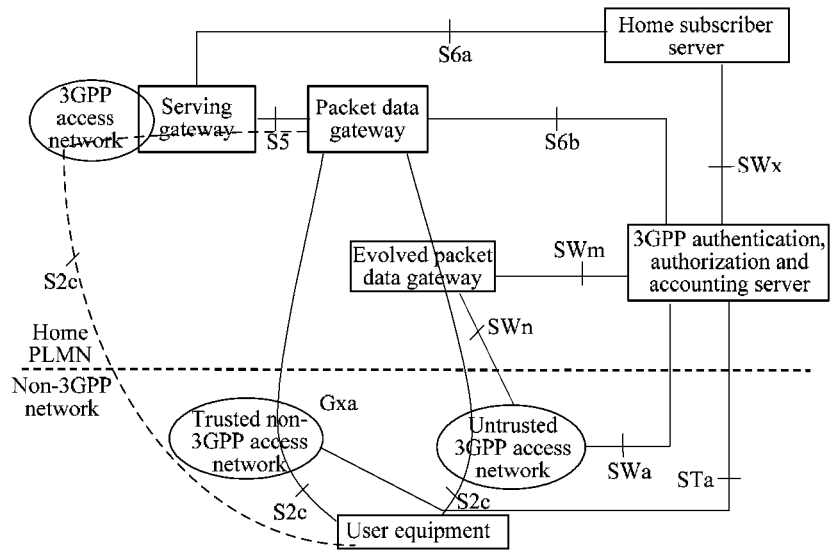
FIG. 1 is a system architecture diagram that is defined by the 3GPP and in which an S2c interface is used to access an EPS network in a non-roaming scenario.

FIG. 1 is a system architecture diagram that is defined by the 3GPP and in which an S2c interface is used to access an EPS network. Embodiments of the present invention can be applied to the EPS network architecture shown in FIG. 1.

As shown in FIG. 1, the S2c interface may be used to access an EPS network by using a non-3GPP access network or a 3GPP network. For a trusted non-3GPP access network, a UE connects to a PDN-GW directly by using the non-3GPP access network; however, for an untrusted non-3GPP access network, the UE needs to connect to a PDN-GW network element by using an evolved packet data gateway ePDG trusted by a home network. For a 3GPP access network, the UE connects to the PDN-GW network element by using an S-GW (serving gateway).

When the UE accesses an EPC by using the PDN-GW via the S2c interface, if the UE accesses the EPC by using a trusted non-3GPP access network, the PDN-GW needs to initiate establishment of a child security association Child SA to protect a data plane; if the UE accesses the EPC by using an untrusted non-3GPP access network, the PDN-GW establishes a DSMIPv6 security channel by using an IPSec channel between the UE and ePDG, so as to perform integrity protection and confidentiality protection for data; if the UE accesses the EPC by using a 3GPP access network, data security protection between the UE and the PDN-GW is provided by using an authentication encryption mechanism of the 3GPP itself.

As can be seen from the foregoing description, the PDN-GW needs to learn whether access of the current UE is performed by using the trusted non-3GPP access network, untrusted non-3GPP access network, or 3GPP access network. This is a precondition for correctly establishing or updating a data security channel of an S2c tunnel, and especially when the UE accesses the EPC via the S2c interface after handing over between the trusted non-3GPP access network, 3GPP access network, and untrusted non-3GPP access network, the PDN-GW needs to distinguish an access scenario, so as to complete correct establishment or update of the data security channel.

In the embodiments of the present invention, in the network architecture shown in FIG. 1, when a UE accesses an EPC via an S2c interface, an authentication and authorization device determines a trust relationship of access of the UE, and sends a PDN-GW a message including a trust relationship indication of the access of the UE, or includes the trust relationship indication of the access of the UE in an authorization response message sent to the PDN-GW; the PDN-GW establishes or updates a data security channel according to the trust relationship, indicated in the message, of the access of the UE, so as to ensure correct establishment of the data security channel. An AAA server is used as an example for the authentication and authorization device in the embodiments of the present invention. During specific implementation, other devices, such as an HSS (home subscriber server), may also be used as an authentication and authorization device in an embodiment.

Figure 2:
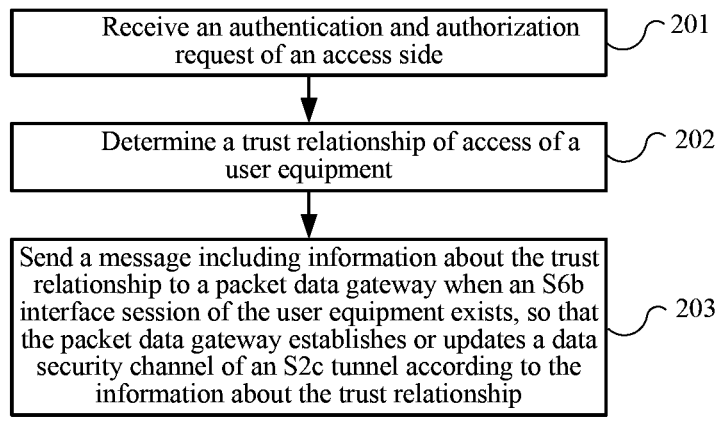
FIG. 2 is a method for processing a data security channel when an S2c interface is used to access an EPS network by using a non-3GPP access network according to an embodiment of the present invention.

FIG. 2 is a method for processing a data security channel when an S2c interface is used to access an EPS network according to an embodiment of the present invention. An authentication and authorization device determines a trust relationship of access of a user equipment and sends a PDN-GW a message including a trust relationship indication of the access of the user equipment, and the PDN-GW establishes or updates a data security channel according to the trust relationship of user access indicated in the message, so as to ensure correct establishment of the data security channel.

201. Receive an authentication and authorization request of an access side.

When the UE accesses an EPC network via the S2c interface, an AAA server receives the authentication and authorization request of the access side, which requests authentication and authorization for the accessed UE. Because manners in which the UE accesses the EPC are different, when the UE performs the access by using a trusted non-3GPP access network, the access side refers to the trusted non-3GPP access network, and when the UE performs the access by using an untrusted non-3GPP access network, the access side refers to the untrusted non-3GPP access network or an ePDG.

202. Determine the trust relationship of the access of the user equipment.

The AAA server determines whether the access of the user equipment is trusted access or untrusted access according to parameters carried in the authentication and authorization request of the access side, where the parameters include one or more of the following: an access network identifier ANID, a visited network identity (this identity is required only in a roaming scenario), an access type, a security mechanism that is used in an access network, and the like.

203. Send a message including information about the trust relationship to a packet data gateway when an S6b interface session of the user equipment exists, so that the packet data gateway establishes or updates a data security channel of an S2c tunnel according to the information about the trust relationship.

The AAA server determines whether the S6b interface session of the UE already exists, that is, whether an S6b interface session context of the UE already exists, where the session context includes a session identity Session ID and a user equipment identity. If the S6b interface session already exists, it indicates that the PDN-GW has requested the AAA server to perform authentication and authorization for the UE, and the access of the UE should be a handover scenario. In this case, the AAA server sends a message to the PDN-GW, where the message includes information indicating the trust relationship of the access of the UE, that is, whether the access of the UE is trusted non-3GPP access or untrusted non-3GPP access. The PDN-GW establishes or updates the data security channel of the S2c tunnel according to the received trust relationship of the access of the UE.

In this embodiment of the present invention, when an authentication and authorization request of an access side is received, if an S6b interface session of a UE already exists, a message including information about a trust relationship of access of the UE is sent to a PDN-GW, so that the PDN-GW can correctly establish or update a data security channel of an S2c tunnel.

Figure 3:
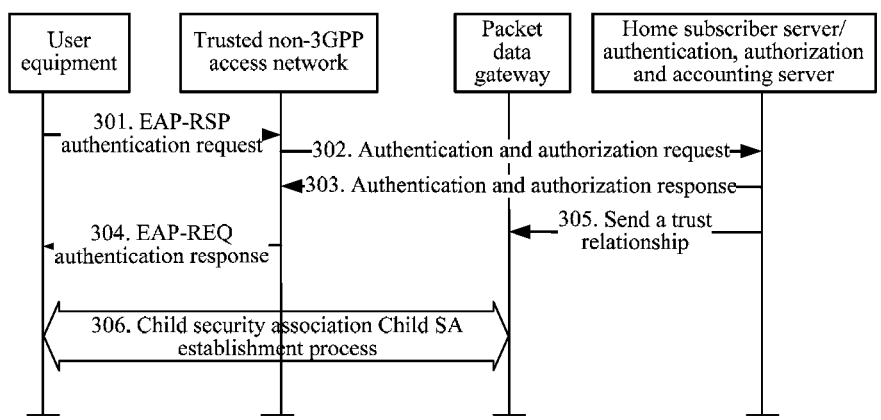
FIG. 3 is a schematic flowchart of a procedure of a method for processing a data security channel when an S2c interface is used to access an EPS network by using a trusted non-3GPP access network according to an embodiment of the present invention.

The following describes embodiments of the present invention with more details by combining specific examples. FIG. 3 is a schematic flowchart of a method for processing a data security channel when an S2c interface is used to access an EPS network by using a trusted non-3GPP access network according to an embodiment of the present invention.

301. A UE sends an EAP-RSP authentication request message to the trusted non-3GPP access network.

302. The trusted non-3GPP access network sends an authentication and authorization request to an AAA server, where the authentication and authorization request includes an access network identifier ANID and an access type and may further include parameters such as a security mechanism that is used in an access network. In a roaming scenario, the authentication and authorization request needs to be forwarded by the access network to the AAA server by using an AAA server agent, and the authentication and authorization request further includes a visited network identifier.

The AAA server determines whether access of the UE is trusted access or untrusted access according to the parameters in the received request. Here, it is determined that the access is trusted access, that is, the access of the UE is performed by using the trusted non-3GPP access network. The parameters include one or more of the following: the access network identifier ANID, the visited network identity (this identity is required only in a roaming scenario), the access type, the security mechanism that is used in the access network, and the like.

303. The AAA server sends an authentication and authorization response message to the trusted non-3GPP access network, where the response message includes the result of trusted access.

304. The trusted non-3GPP access network sends an EAP-REQ authentication response message to the UE, where the response message includes the result of trusted access.

305. The AAA server determines whether an S6b interface session of the UE already exists, that is, whether an S6b interface session context of the UE already exists, where the session context includes a session identity Session ID and a user equipment identity. If the S6b interface session already exists, it indicates that a PDN-GW has previously requested the AAA server for an authentication and authorization request for the UE, and the access should be a handover scenario. The AAA server sends a trust relationship to the PDN-GW, that is, the AAA server sends a trust relationship message to the PDN-GW, where the trust relationship message includes a trust relationship information element whose value is "Trusted" or "Untrusted". In this case, "Trusted" is indicated, which represents that it is currently trusted access.

306. After receiving the trust relationship message that indicates trusted access, the PDN-GW may initiate a procedure for establishing a Child SA with the UE at any time. If the PDN-GW receives a Child SA establishment request initiated by the UE, it accepts the request and establishes a Child SA.

In a practical implementation procedure, the AAA server receives the authentication and authorization request sent by the trusted non-3GPP access network and determines that the access of the user equipment is trusted access; and if the S6b interface session of the UE already exists, the AAA server may send the trust relationship message to the PDN-GW. That is, step 305 is executed after step 302 and there is no strict execution sequence for steps 303, 304 and 305. Similarly, after receiving the trust relationship message that indicates trusted access, the PDN-GW may initiate the procedure for establishing a Child SA with the UE at any time. That is, step 306 may be executed at any time after step 305 and there is also no strict execution sequence for 303, 304, and 306. However, steps 301 to 304 are executed according to the sequence in the schematic flowchart.

In this embodiment of the present invention, when an authentication and authorization request of a trusted non-3GPP access network is received, a trust relationship of access of a user equipment is determined as trusted access; and when an S6b interface session of the UE already exists, a message including information about the trust relationship of the access of the UE is sent to a PDN-GW, so that the PDN-GW can distinguish an access scenario and complete correct establishment or update of a data security channel.

Figure 4:
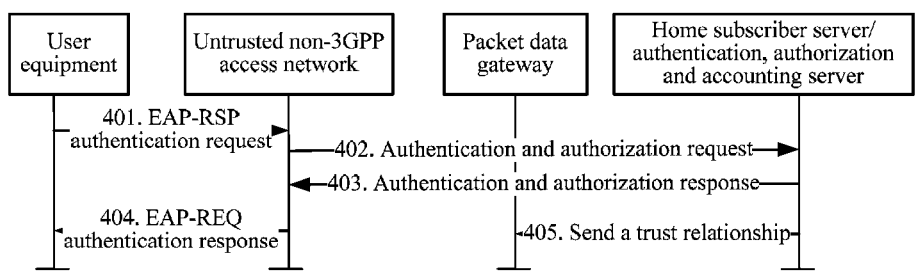
FIG. 4 is a schematic flowchart of a procedure of a method for processing a data security channel when an S2c interface is used to access an EPS network by using an untrusted non-3GPP access network according to an embodiment of the present invention.

FIG. 4 is a schematic flowchart of a procedure of a method for processing a data security channel when an S2c interface is used to access an EPS network by using an untrusted non-3GPP access network according to an embodiment of the present invention.

401. A UE sends an EAP-RSP authentication request message to the untrusted non-3GPP access network.

402. The untrusted non-3GPP access network sends an authentication and authorization request to an AAA server, where the authentication and authorization request includes an access network identifier ANID and an access type and may further include parameters such as a security mechanism that is used in an access network. In a roaming scenario, the authentication and authorization request submitted by the access network needs to be forwarded to the AAA server by using an AAA server agent, and the request includes a visited network identity.

The AAA server determines whether access of the user equipment is trusted access or untrusted access according to the parameters in the authentication and authorization request. It is determined that the access is untrusted access, that is, the access of the UE is performed by using the untrusted non-3GPP access network. The parameters include one or more of the following: the access network identifier ANID, the visited network identity (this identity is required only in a roaming scenario), the access type, the security mechanism that is used in the access network, and the like.

403. The AAA server sends an authentication and authorization response message to the untrusted non-3GPP access network, where the response message includes the result of untrusted access.

404. The untrusted non-3GPP access network sends an EAP-REQ authentication response message to the UE, where the response message includes the result of untrusted access.

405. The AAA server determines whether an S6b interface session of the UE already exists, that is, whether an S6b interface session context of the UE already exists, where the session context includes a session identity Session ID and a user equipment identity. If the S6b interface session already exists, it indicates that a PDN-GW has previously requested the AAA server for an authentication and authorization request for the UE, and the current access should be a handover scenario. The AAA server sends a trust relationship message to the PDN-GW, where the trust relationship message includes a trust relationship information element whose value is "Trusted" or "Untrusted". In this case, "Untrusted" is indicated, which represents that the current access is untrusted access.

After receiving the message indicating that the access of the UE is untrusted access, the PDN-GW no longer initiates a Child SA establishment procedure; and if the PDN-GW receives a Child SA establishment request sent by the UE, it rejects the request. A rejection manner may be as follows: "NO_ADDITIONAL_SAS", "NO_Child_SAS", or another cause value is indicated by a cause value in a Notify Payload in a response message for the Child SA establishment request, which represents that Child SA establishment is no longer accepted. If a Child SA already exists between the PDN-GW and the UE, the PDN-GW initiates a Child SA deletion procedure.

In a practical implementation procedure, the AAA server receives the authentication and authorization request sent by the untrusted non-3GPP access network and determines that the access of the UE is untrusted access; and if the S6b interface session of the UE already exists, the AAA server may send the trust relationship message to the PDN-GW. That is, step 405 is executed after step 402 and there is no strict execution sequence for steps 403, 404 and 405. However, steps 401 to 404 are executed according to the sequence in the schematic flowchart.

In this embodiment of the present invention, when an authentication and authorization request of an untrusted non-3GPP access network is received, a trust relationship of access of a UE is determined as untrusted access; and when an S6b interface session related to the UE already exists, a message including information about the trust relationship of the access of the UE is sent to a PDN-GW, so that the PDN-GW can distinguish an access scenario and complete establishment or update of a data security channel.

Figure 5:
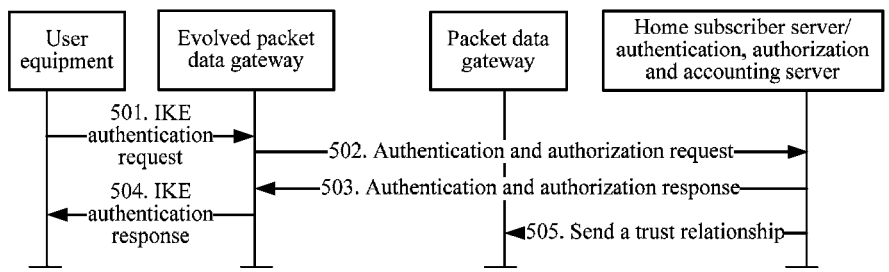
FIG. 5 is a schematic flowchart of a procedure of a method for processing a data security channel when an S2c interface is used to access an EPS network by using an untrusted non-3GPP access network according to an embodiment of the present invention.

FIG. 5 is a schematic flowchart of a procedure of processing a data security channel when an S2c interface is used to access an EPS network by using an untrusted non-3GPP access network according to an embodiment of the present invention.

501. A UE sends an IKE authentication request to an evolved packet data gateway ePDG to request establishment of an IPSec tunnel between the UE and the ePDG.

502. The ePDG sends an authentication and authorization request to an AAA server, where the authentication and authorization request includes an access network identifier ANID and an access type and may further include parameters such as a security mechanism that is used in an access network. In a roaming scenario, the authentication and authorization request is forwarded by using an AAA server agent, and the request includes a visited network identity.

The AAA server determines whether access of the UE is trusted access or untrusted access according to the parameters in the authentication request. It is determined that the access is untrusted access, that is, the access of the UE is performed by using the untrusted non-3GPP access network. The parameters include one or more of the following: the access network identifier ANID, the visited network identity (this identity is required only in a roaming scenario), the access type, the security mechanism that is used in the access network, and the like.

503. The AAA server sends an authentication and authorization response message to the ePDG.

504. The ePDG sends an IKE authentication response message to the UE.

505. The AAA server determines whether an S6b interface session of the UE already exists, that is, whether an S6b interface session context of the UE already exists, where the session context includes a session identity Session ID and a user equipment identity. If the S6b interface session already exists, it indicates that a PDN-GW has previously requested the AAA server for an authentication and authorization request for the UE, and the access of this time should be a handover scenario. The AAA server sends a trust relationship message to the PDN-GW, where the trust relationship message includes a trust relationship information element whose value is "Trusted" or "Untrusted". In this case, "Untrusted" is indicated, which represents that it is currently untrusted access.

After receiving the message indicating that the access of the UE is untrusted access, the PDN-GW no longer initiates a Child SA establishment procedure; and if the PDN-GW receives a Child SA establishment request sent by the UE, it rejects the request. A rejection manner may be as follows: "NO_ADDITIONAL_SAS", "NO_Child_SAS", or another cause value is indicated by a cause value in a Notify Payload in a response message for the Child SA establishment request, which represents that Child SA establishment is no longer accepted. If a Child SA already exists between the PDN-GW and the UE, the PDN-GW initiates a Child SA deletion procedure.

In a practical implementation procedure, the AAA server receives the authentication and authorization request sent by the evolved packet data gateway ePDG and determines that the access of the UE is untrusted access; and if the S6b interface session of the UE already exists, the AAA server may send the trust relationship message to the PDN-GW. That is, step 505 is executed after step 502 and there is no strict execution sequence for steps 503, 504 and 505. However, steps 501 to 504 are executed according to the sequence in the schematic flowchart.

In this embodiment of the present invention, when an authentication and authorization request of an evolved packet data gateway ePDG is received, a trust relationship of access of a UE is determined as untrusted access; and when an S6b interface session of the UE already exists, a message including information about the trust relationship of the access of the UE is sent to a PDN-GW, so that the PDN-GW can distinguish an access scenario and complete establishment or update of a data security channel.

Figure 6:
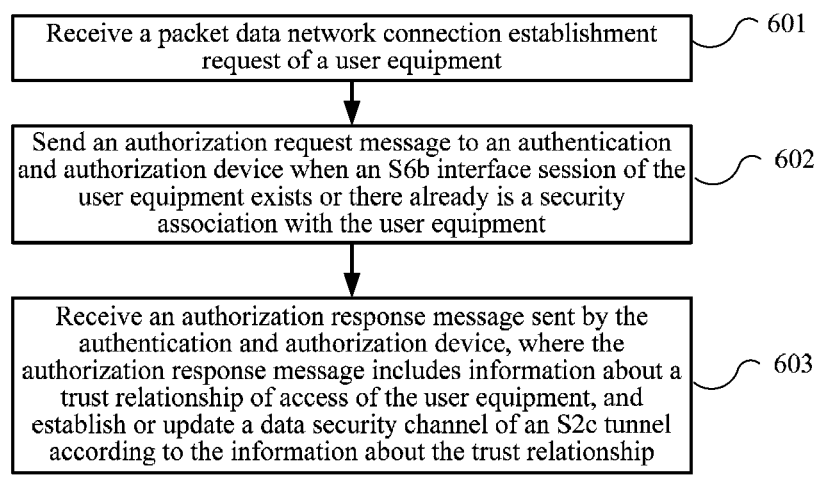
FIG. 6 is a method for processing a data security channel when an S2c interface is used to access an EPS network according to another embodiment of the present invention.

FIG. 6 is a method for processing a data security channel when an S2c interface is used to access an EPS network according to another embodiment of the present invention. A PDN-GW receives a packet data network connection establishment request, sends an authorization request to an authentication and authorization device, and establishes or updates a data security channel of an S2c tunnel according to a trust relationship of current access, where the trusted relationship is indicated in a response message of the authentication and authorization device.

601. Receive a packet data network connection establishment request of a user equipment.

When the UE accesses an EPC by using a non-3GPP access network via the S2c interface, the received packet data network connection establishment request is a binding update Binding Update message sent by the UE; when the UE accesses the EPC by using a 3GPP access network via the S2c interface, the received packet data network connection establishment request is a session establishment message sent by an MME (Mobility Management Entity), where the session establishment message is sent by the mobility management network element after receiving the packet data network connection request sent by the user equipment.

602. Send an authorization request message to the authentication and authorization device when an S6b interface session of the user equipment exists or there already is a security association with the user equipment.

The PDN-GW determines whether an S6b session of the accessed UE already exists, that is, whether an S6b interface session context of the UE already exists, where the session context includes a session identity Session ID and a user equipment identity. Alternatively, the PDN-GW determines whether a security association has been established with the UE, that is, whether a security context of the UE already exists, where the security context includes a security parameter index SPI and the UE identity. If the S6b interface session of the UE already exists or a security association has been established with the UE, it indicates that the PDN-GW has previously requested an AAA server to perform authentication and authorization for the UE; in this case, the PDN-GW sends an authorization request to the AAA server.

603. Receive an authorization response message sent by the authentication and authorization device, where the authorization response message includes information about a trust relationship of access of the user equipment, and establish or update the data security channel of the S2c tunnel according to the information about the trust relationship.

An authorization response message returned by the AAA server is received and includes information indicating the trust relationship of the access of the user equipment, that is, whether the access of the user equipment is trusted non-3GPP access, untrusted non-3GPP access, or 3GPP access. The PDN-GW establishes or updates the data security channel of the S2c tunnel according to the received trust relationship of the access of the user equipment.

In this embodiment of the present invention, when a packet data network connection establishment request of a user equipment is received, if an S6b interface session of the UE already exists or a security association has been established with the UE, an authorization request message is sent to an authentication and authorization device, and a data security channel of an S2c tunnel is established or updated according to a trust relationship of access of the user equipment, where the trust relationship is indicated in a response message of the authentication and authorization device.

Figure 7:
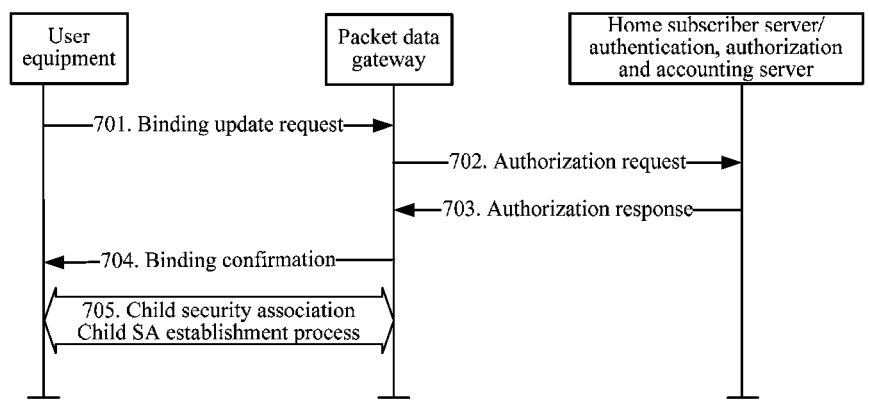
FIG. 7 is a schematic flowchart of a procedure of a method for processing a data security channel when an S2c interface is used to access an EPS network by using a trusted non-3GPP access network according to another embodiment of the present invention.

The following describes another embodiment of the present invention with more details by combining a specific example. FIG. 7 is a schematic flowchart of a method for processing a data security channel when an S2c interface is used to access an EPS network by using a trusted non-3GPP access network according to another embodiment of the present invention.

701. A UE sends a binding update request Binding Update message to a PDN-GW, so that the PDN-GW binds a local address of the UE to a home address of the UE and establishes a data connection between the UE and the PDN-GW.

702. After the PDN-GW receives the binding update request message, the PDN-GW determines whether an S6b session of the UE already exists, that is, whether an S6b interface session context of the UE already exists, where the session context includes a session identity Session ID and a user equipment identity. Alternatively, the PDN-GW determines whether a security association has been established with the UE, that is, whether a security context of the UE already exists, where the security context includes a security parameter index SPI and the UE identity. If the S6b interface session of the UE already exists or a security association has been established with the UE, it indicates that the PDN-GW has previously requested an AAA server to perform authentication and authorization for the UE; in this case, the PDN-GW sends an authorization request to the AAA server. The authorization request message includes the UE identity and further includes a network identifier. The network identifier includes one or more of the following types of information: an access network identifier, a security mechanism that is used in an access network, an access type; in the case of a roaming scenario, a visited network identity is further included.

703. The AAA server determines whether access of the user equipment is trusted access according to a configured policy and sends an authorization response message to the PDN-GW, where the message includes a trust relationship information element whose value is "Trusted", "Untrusted", or "3GPP", which indicates that the access of the user equipment is trusted non-3GPP access, untrusted non-3GPP access, or 3GPP access. Here, the value is "Trusted", which indicates trusted non-3GPP access.

A method for determining, by the AAA server, whether the access of the user equipment is trusted access may be: including a correspondence between a network identifier and a trust relationship in a policy, and querying, by the AAA server according to the network identifier in the authorization request message, the configured policy to determine a trust relationship of the access of the user equipment. In the policy, if the trust relationship needs to be determined according to the access network identifier, but the authorization request message does not include the access network identifier and includes the access type, the AAA server may also construct the access network identifier according to the access type. A specific method is as follows: The access type is generally represented by using a method of an integer type, for example, 0 represents WLAN, and 2001 represents HRPD; therefore, the AAA server queries, according to the access type, a table to learn a specific access type description corresponding to an integer of the access type, where the description is represented by using a character string and serves as a prefix of the access network identifier; in this case, the access network prefix is a character string such as "WLAN" and "HRPD"; besides the prefix, the access network identifier may have no additional character string, or a generation rule is determined by the AAA server itself.

The determining method may be implemented in the following manner: A record of a correspondence between a trust relationship and a network identifier is included in a policy, and a configured policy data table is queried; if the trust relationship corresponding to the network identifier is trusted access, it is determined that the access of the UE is trusted access; and if the trust relationship is untrusted access, it is determined that the access of the UE is untrusted access.

704. The PDN-GW sends a binding update confirmation message to the UE.

705. After receiving, from the AAA server, the authorization response message indicating that the access of the user equipment is trusted access, the PDN-GW may initiate a procedure for establishing a Child SA with the UE at any time. If the PDN-GW receives a Child SA establishment request initiated by the UE, it accepts the request and establishes a Child SA.

In this embodiment of the present invention, when a UE accesses an EPC network by using a trusted non-3GPP access network via an S2c interface, and when a PDN-GW receives a binding update request Binding Update message of the UE, if an S6b interface session of the UE already exists or a security association has been established with the UE, an authorization request message is sent to an authentication and authorization device, and a data security channel of an S2c tunnel is established or updated according to a trust relationship of access of the user equipment, where the trust relationship is indicated in a response message of the authentication and authorization device and is trusted access here. In this way, the PDN-GW can distinguish an access scenario and complete establishment or update of a data security channel.

Figure 8:
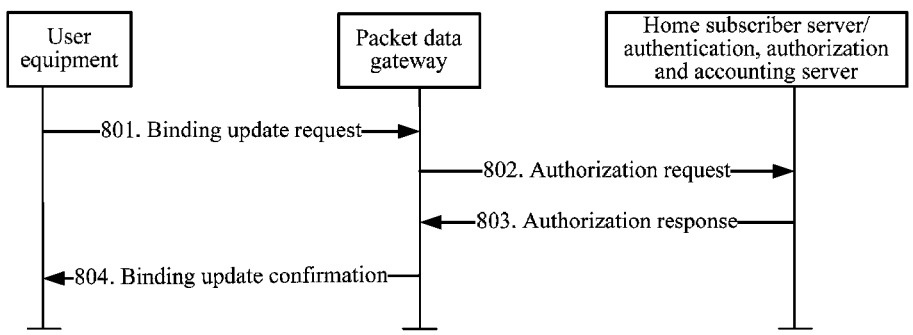
FIG. 8 is a schematic flowchart of a procedure of a method for processing a data security channel when an S2c interface is used to access an EPS network by using an untrusted non-3GPP access network according to another embodiment of the present invention.

FIG. 8 is a schematic flowchart of a method for processing a data security channel when an S2c interface is used to access an EPS network by using an untrusted non-3GPP access network according to another embodiment of the present invention. The method in FIG. 8 corresponds to the method in FIG. 7. Therefore, some detailed description is omitted properly.

801. A UE sends a binding update request Binding Update message to a PDN-GW, so that the PDN-GW binds a local address of the UE to a home address of the UE and establishes a data connection between the UE and the PDN-GW.

802. After the PDN-GW receives the binding update request message, the PDN-GW determines whether an S6b session of the UE already exists or a security association has been established with the UE. If the S6b interface session of the UE already exists or a security association has been established with the UE, it indicates that the PDN-GW has previously requested an AAA server to perform authentication and authorization for the UE; in this case, the PDN-GW sends an authorization request message to the AAA server. The authorization request message includes a UE identity and further includes a network identifier. The network identifier includes one or more of the following types of information: an access network identifier, a security mechanism that is used in an access network, an access type; in the case of a roaming scenario, a visited network identity is further included.

803. The AAA server determines whether access of the user equipment is trusted access according to a configured policy and sends an authorization response message to the PDN-GW, where the message includes a trust relationship information element whose value is "Trusted", "Untrusted", or "3GPP", which indicates that the current access is trusted non-3GPP access, untrusted non-3GPP access, or 3GPP access. Here, the value is "Untrusted", which indicates untrusted non-3GPP access. After receiving the message indicating that the access of the user equipment is untrusted access, the PDN-GW no longer initiates a Child SA establishment procedure; and if the PDN-GW receives a Child SA establishment request sent by the UE, it rejects the request. A rejection manner may be as follows: "NO_ADDITIONAL_SAS", "NO_Child_SAS", or another cause value is indicated by a cause value in a Notify Payload in a response message for the Child SA establishment request, which represents that Child SA establishment is no longer accepted. If a Child SA already exists between the PDN-GW and the UE, the PDN-GW initiates a Child SA deletion procedure.

804. The PDN-GW sends a binding update confirmation message to the UE.

In this embodiment of the present invention, when a UE accesses an EPC network by using an untrusted non-3GPP access network by using an S2c interface, and when a PDN-GW receives a binding update request Binding Update message of the UE, if an S6b interface session of the UE already exists or a security association has been established with the UE, an authorization request message is sent to an authentication and authorization device, and a data security channel of an S2c tunnel is established or updated according to a trust relationship of access of the user equipment, where the trust relationship is indicated in an authorization response message of the authentication and authorization device and is untrusted access here. In this way, the PDN-GW can distinguish an access scenario and complete establishment or update of a data security channel.

Figure 9:
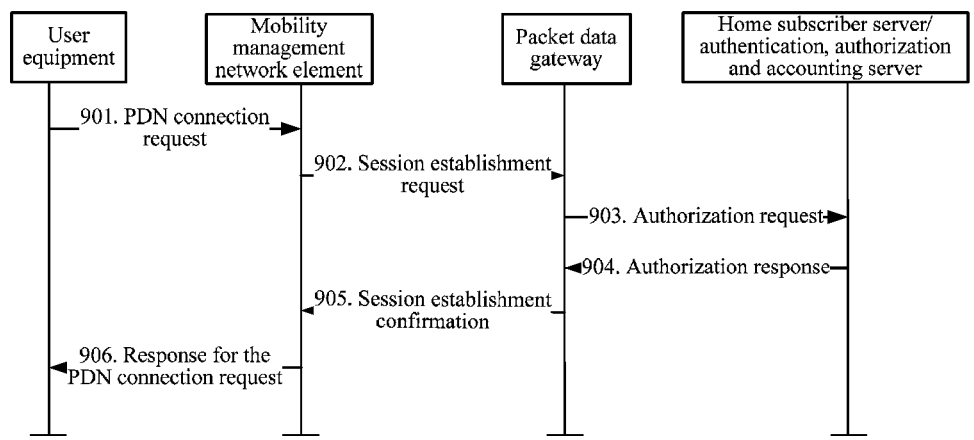
FIG. 9 is a schematic flowchart of a procedure of a method for processing a data security channel when an S2c interface is used to access an EPS network by using a 3GPP access network according to another embodiment of the present invention.

FIG. 9 is a schematic flowchart of a method for processing a data security channel when an S2c interface is used to access an EPS network by using a 3GPP access network according to another embodiment of the present invention.

901. A UE sends a PDN (packet data network) connection request to an MME.

902. The MME sends a session establishment request to a PDN-GW to establish a PDN connection for the UE. The session establishment request includes a UE identity, a PDN type, a wireless access type, and the like. The PDN type indicates a type, such as IPv4, IPv6, or IPv4v6, of an IP address allocated to the UE for the PDN connection. The wireless access type indicates 3GPP access in this case, for example, E-UTRAN and UTRAN. In the case of a handover scenario, the request message further includes a handover indication.

903. After receiving the session establishment request message, the PDN-GW determines whether an S6b session of the UE already exists, that is, whether an S6b interface session context of the UE already exists, where the session context includes a session identity Session ID and a user equipment identity. Alternatively, the PDN-GW determines whether a security association has been established with the UE, that is, whether a security context of the UE already exists, where the security context includes a security parameter index SPI and the UE identity. If the S6b interface session of the UE already exists or a security association has been established with the UE, it indicates that the PDN-GW has previously requested an AAA server to perform authentication and authorization for the UE; in this case, the PDN-GW sends an authorization request to the AAA server. The authorization request message includes the UE identity and further includes a network identifier, where the network identifier includes one or more of the following types of information: an access network identifier and a wireless access type.

904. The AAA server determines whether access of the user equipment is trusted access according to a configured policy and sends an authorization response message to the PDN-GW, where the message includes a trust relationship information element whose value is "Trusted", "Untrusted", or "3GPP", which indicates that the access of the user equipment is trusted non-3GPP access, untrusted non-3GPP access, or 3GPP access. Here, the value is "3GPP", which indicates 3GPP access. After receiving the message indicating that the current access is 3GPP access, the PDN-GW no longer initiates a Child SA establishment procedure; and if the PDN-GW receives a Child SA establishment request sent by the UE, it rejects the request. A rejection manner may be as follows: "NO_ADDITIONAL_SAS", "NO_Child_SAS", or another cause value is indicated by a cause value in a Notify Payload in a response message for the Child SA establishment request, which represents that Child SA establishment is no longer accepted. If a Child SA already exists between the PDN-GW and the UE, the PDN-GW initiates a Child SA deletion procedure.

A method for determining, by the AAA server, whether the access of the user equipment is trusted access may be: including a correspondence between a network identifier and a trust relationship in a policy, and querying, by the AAA server according to the network identifier in the authorization request message, the configured policy to determine a trust relationship of the access of the user equipment. In the policy, if the trust relationship needs to be determined according to the access network identifier, but the authorization request message does not include the access network identifier and includes the wireless access type, the AAA server may also construct the access network identifier according to the wireless access type. A specific method is as follows: The wireless access type is generally represented by using a method of an integer type, for example, 3 represents WLAN, and 6 represents E-UTRAN; therefore, the AAA server queries, according to the wireless access type, a table to learn a specific access type description corresponding to an integer of the wireless access type, where the description is represented by using a character string and serves as a prefix of the access network identifier;

in this case, the prefix of the access network identifier is a character string such as "WLAN" and "E-UTRAN"; besides the prefix, the access network identifier may have no additional character string, or a generation rule is determined by the AAA server itself.

The determining method may be implemented in the following manner: A record of a correspondence between a trust relationship and a network identifier is included in a policy, and a configured policy data table is queried; if the trust relationship corresponding to the network identifier is trusted access, it is determined that the access of the user equipment is trusted access; if the trust relationship is untrusted access, it is determined that the access of the user equipment is untrusted access; and if the trust relationship is 3GPP access, it is determined that the access of the user equipment is 3GPP access.

905. The PDN-GW sends a session establishment confirmation message to the MME.

906. The MME sends a response message for the PDN connection request to the UE.

In this embodiment of the present invention, when a UE accesses an EPC network by using a 3GPP access network via an S2c interface, an MME sends a session establishment request message to a PDN-GW according to a PDN connection request of the UE; if an S6b interface session of the UE already exists or a security association has been established with the UE, the PDN-GW sends an authorization request message to an authentication and authorization device and establishes or updates a data security channel of an S2c tunnel according to a trust relationship of access of the user equipment, where the trust relationship is indicated in a response message of the authentication and authorization device and is 3GPP access here. In this way, the PDN-GW can distinguish an access scenario and complete establishment or update of a data security channel.

Figure 10:
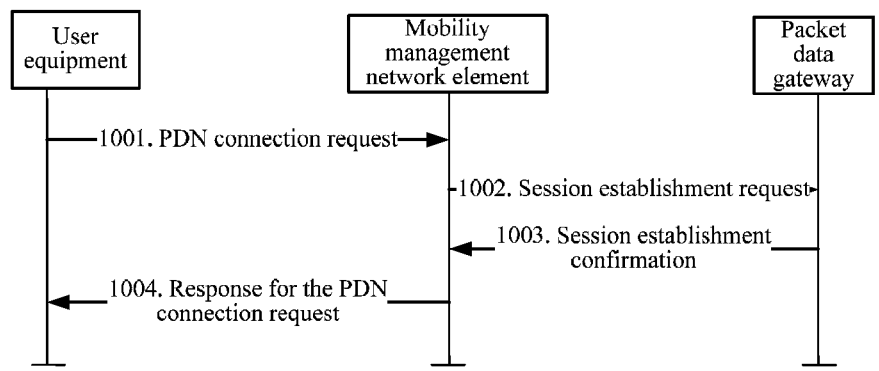
FIG. 10 is a schematic flowchart of a procedure of a method for processing a data security channel when an S2c interface is used to access an EPS network by using a 3GPP access network according to still another embodiment of the present invention.

FIG. 10 is a schematic flowchart of a procedure of a method for processing a data security channel when an S2c interface is used to access an EPS network by using a 3GPP access network according to still another embodiment of the present invention. A PDN-GW receives a packet data network connection establishment request, determines a trust relationship of access of a user equipment according to information in the establishment request message, and establishes or updates a data security channel of an S2c tunnel.

1001. A UE sends a PDN connection request to an MME.

1002. The MME sends a session establishment request to the PDN-GW to establish a PDN connection for the UE. The session establishment request includes information such as a UE identity, a PDN type, and a wireless access type. The wireless access type indicates 3GPP access in this case, for example, E-UTRAN and UTRAN. The PDN type indicates a type, such as IPv4, IPv6, or IPv4v6, of an IP address allocated to the UE for the PDN connection. In the case of a handover scenario, the request message further includes a handover indication.

The PDN-GW determines whether an S6b session of the UE already exists, that is, whether an S6b interface session context of the UE already exists, where the session context includes a session identity Session ID and a user equipment identity. Alternatively, the PDN-GW determines whether a security association has been established with the UE, that is, whether a security context of the UE already exists, where the security context includes a security parameter index SPI and the UE identity. If the S6b interface session of the UE already exists or a security association has been established with the UE, it indicates that the PDN-GW has previously requested an AAA server to perform authentication and authorization for the UE; in this case, the PDN-GW determines the trust relationship of the access of the user equipment as 3GPP access according to wireless access type information in the session establishment request. The PDN-GW no longer initiates a Child SA establishment procedure; and if the PDN-GW receives a Child SA establishment request sent by the UE, it rejects the request. A rejection manner may be as follows: "NO_ADDITIONAL_SAS", "NO_Child_SAS", or another cause value is indicated by a cause value in a Notify Payload in a response message for the Child SA establishment request, which represents that Child SA establishment is no longer accepted. If a Child SA already exists between the PDN-GW and the UE, the PDN-GW initiates a Child SA deletion procedure.

1003. The PDN-GW sends a session establishment confirmation message to the MME.

1004. The MME sends a response message for the PDN connection request to the UE.

In this embodiment of the present invention, when a UE accesses an EPC network by using a 3GPP access network via an S2c interface, an MME sends a session establishment request message to a PDN-GW according to a PDN connection request of the UE; if the PDN-GW determines that an S6b interface session of the UE already exists or a security association has been established with the UE, the PDN-GW determines a trust relationship of access of the user equipment according to information in the session establishment request message and establishes or updates a data security channel of an S2c tunnel, where the trust relationship is 3GPP access here. In this way, the PDN-GW can distinguish an access scenario and complete establishment or update of a data security channel.

Figure 11:
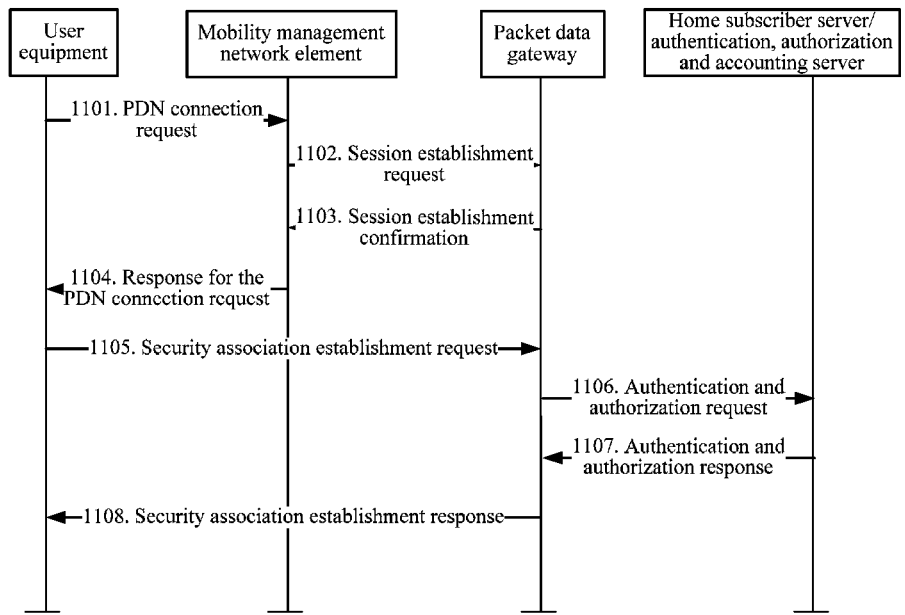
FIG. 11 is a schematic flowchart of a procedure of a method for processing a data security channel when an S2c interface is used to access an EPS network by using a 3GPP access network according to still another embodiment of the present invention.

FIG. 11 is a schematic flowchart of a procedure of a method for processing a data security channel when an S2c interface is used to access an EPS network by using a 3GPP access network according to still another embodiment of the present invention. A PDN-GW receives a security association establishment request of a UE, sends an authentication and authorization request message to an authentication and authorization device, and establishes or updates a data security channel of an S2c tunnel according to a trust relationship of access of the user equipment, where the trust relationship is indicated in a response message of the authentication and authorization device.

1101. A UE sends a PDN connection request to an MME.

1102. The MME sends a session establishment request to the PDN-GW to establish a PDN connection for the UE. The session establishment request includes a UE identity, a PDN type, a wireless access type, and the like. The PDN type indicates a type, such as IPv4, IPv6, or IPv4v6, of an IP address allocated to the UE for the PDN connection. The wireless access type indicates 3GPP access in this case, for example, E-UTRAN and UTRAN. In the case of a handover scenario, the request message further includes a handover indication.

1103. The PDN-GW sends a session establishment confirmation message to the MME.

1104. The MME sends a response message for the PDN connection request to the UE.

1105. The UE sends a security association establishment request to the PDN-GW to establish a DSMIPv6 SA between the UE and the PDN-GW, where the security association establishment request may specifically be a security association establishment request message such as an IKE authentication request and includes APN (access point name) information.

1106. The PDN-GW sends an authentication and authorization request message to an AAA server to register APN and PDN-GW information, where the request message includes the UE identity. A network identifier may further be included, and the network identifier includes one or more of the following types of information: an access network identifier and a wireless access type.

1107. The AAA server determines the trust relationship of the access of the user equipment according to a configured policy and sends an authentication and authorization response message to the PDN-GW, where the message includes a trust relationship information element whose value is "Trusted", "Untrusted", "3GPP", or "UNKNOWN"; in this case, "3GPP" or "UNKNOWN" is indicated, where the value "3GPP" represents that the current access is 3GPP access, and the value "UNKNOWN" represents that the AAA server cannot provide the trust relationship of the access of the user equipment. After receiving a message indicating that the trust relationship is "UNKNOWN", the PDN-GW determines the trust relationship of the access of the user equipment according to wireless access type information in the session establishment request received in step 1102, where the trust relationship is 3GPP access in this case.

After receiving a message that is sent by the AAA and indicates that the access of the user equipment is 3GPP access or receiving a message indicating that the trust relationship of the access of the user equipment is "UNKNOWN", the PDN-GW determines by itself that the access of the user equipment is 3GPP access and no longer initiates a Child SA establishment procedure; and if the PDN-GW receives a Child SA establishment request sent by the UE, it rejects the request. A rejection manner may be as follows: "NO_ADDITIONAL_SAS", "NO_Child_SAS", or another cause value is indicated by a cause value in a Notify Payload in a response message for the Child SA establishment request, which represents that Child SA establishment is no longer accepted. If a Child SA already exists between the PDN-GW and the UE, the PDN-GW initiates a Child SA deletion procedure.

A method for determining, by the AAA server, whether the access of the user equipment is trusted access may be: including a correspondence between a network identifier and a trust relationship in a policy, and querying, by the AAA server according to the network identifier in the authorization request message, the configured policy to determine a trust relationship of the access of the user equipment. In the policy, if the trust relationship needs to be determined according to the access network identifier, but the authorization request message does not include the access network identifier and includes the wireless access type, the AAA server may also construct the access network identifier according to the wireless access type. A specific method is as follows: The wireless access type is generally represented by using a method of an integer type, for example, 3 represents WLAN, and 6 represents E-UTRAN; therefore, the AAA server queries, according to the wireless access type, a table to learn a specific access type description corresponding to an integer of the wireless access type, where the description is represented by using a character string and serves as a prefix of the access network identifier; in this case, the prefix of the access network identifier is a character string such as "WLAN" and "E-UTRAN"; besides the prefix, the access network identifier may have no additional character string, or a generation rule is determined by the AAA server itself.

The determining method may be implemented in the following manner: A record of a correspondence between a trust relationship and a network identifier is included in a policy, and a configured policy data table is queried; if the trust relationship corresponding to the network identifier is trusted access, it is determined that the access of the user equipment is trusted access; if the trust relationship is untrusted access, it is determined that the access of the user equipment is untrusted access; if the trust relationship is 3GPP access, it is determined that the access of the user equipment is 3GPP access; and if no corresponding record is found, "UNKNOWN" is returned, which represents that the trust relationship of the access of the user equipment cannot be determined.

1108. The PDN-GW sends a security association establishment response message to the UE, where the response message includes an IP address allocated by the PDN-GW to the UE.

In this embodiment of the present invention, when a UE accesses an EPC network by using a 3GPP access network via an S2c interface, a PDN-GW receives a security association establishment request of the UE, then sends an authentication and authorization request message to an authentication and authorization device, and establishes or updates a data security channel of an S2c tunnel according to a trust relationship of access of the user equipment, where the trust relationship is indicated in a response message of the authentication and authorization device and is indicated as 3GPP access or cannot be determined. In this way, the PDN-GW can distinguish an access scenario and complete establishment or update of a data security channel.

Figure 12:
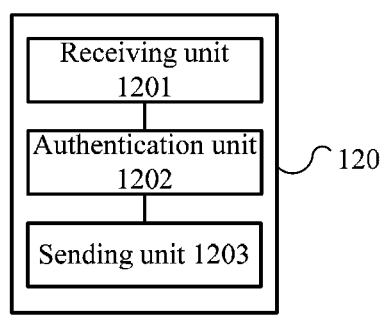
FIG. 12 is a block diagram of an authentication and authorization device according to an embodiment of the present invention.

FIG. 12 is a block diagram of an authentication and authorization device according to an embodiment of the present invention. A nonrestrictive example of the authentication and authorization device 120 in FIG. 12 is a home subscriber server/authentication, authorization and accounting server device shown in FIG. 3-FIG. 5 and FIG. 7-FIG. 9, including a receiving unit 1201, an authentication unit 1202, and a sending unit 1203.

The receiving unit 1201 is configured to receive an authentication and authorization request of an access side. The authentication unit 1202 is configured to authenticate the received authentication and authorization request, determine a trust relationship of access of a user equipment, and when an S6b session of the UE already exists, instruct the sending unit to send a message that includes trust relationship indication information to a PDN-GW. The sending unit 1203 is configured to send the message that includes the trust relationship indication information to the PDN-GW.

In this embodiment of the present invention, when an authentication and authorization request of an access side is received, a trust relationship of access of a user equipment of this time is determined; if an S6b interface session of the UE already exists, a message including information about the trust relationship of the access of the user equipment is sent to a PDN-GW, so that the PDN-GW can correctly establish or update a data security channel of an S2c tunnel.

The receiving unit 1201 receives the authentication and authorization request sent by the access side. When the UE accesses an EPC network via an S2c interface, the receiving unit receives an authentication and authorization request of the access side, which requests authentication and authorization for the access. Because access manners are different, when the UE performs the access by using a trusted non-3GPP access network, the access side refers to the trusted non-3GPP access network, and when the UE performs the access by using an untrusted non-3GPP access network, the access side refers to the untrusted non-3GPP access network or an ePDG.

The authentication unit 1202 determines whether the access of the user equipment is trusted access or untrusted access according to parameters carried in the received authentication and authorization request, where the parameters include one or more of the following: an access network identifier ANID, a visited network identity (this identity is required only in a roaming scenario), an access type, a security mechanism that is used in an access network, and the like. The authentication unit determines whether the access of the user equipment is trusted access according to a configured policy, where the policy includes a correspondence between an access network identifier (a visited network identity is further required in a roaming scenario) and a trust relationship. A determining method may be: querying, according to the access network identifier (the visited network identity is further required in a roaming scenario) in the authentication and authorization request message, the configured policy to determine the trust relationship of the access of the user equipment. If the authentication and authorization request message does not include the access network identifier, the access network identifier needs to be constructed according to an access type identity. Specifically, the access type is generally represented by using a method of an integer type, for example, 0 represents WLAN, and 2001 represents HRPD; an access network prefix is a character string such as "WLAN" and "HRPD"; the authentication unit 1202 queries, according to the access type, a table to learn a specific access type description corresponding to an integer of the access type, where the description is represented by using a character string and serves as a prefix of the access network identifier; besides the prefix, the access network identifier may have no additional character string, or a generation rule is determined by the authentication and authorization device itself.

The determining method may use the following manner querying a configured policy data table to find a trust relationship corresponding to the access network identifier (the visited network identity is further required in a roaming scenario); if the trust relationship is trusted access, determining that the current access is trusted access; and if the trust relationship is untrusted access, determining that the current access is untrusted access.

The authentication unit determines whether the S6b session of the accessed UE already exists, that is, whether an S6b interface session context of the UE already exists, where the session context includes a session identity Session ID and a user equipment identity. If the S6b interface session of the UE already exists, it indicates that the PDN-GW has previously requested the authentication and authorization device to perform authentication and authorization for the UE. In this case, the authentication unit instructs the sending unit to send a message to the PDN-GW, where the message includes information indicating the trust relationship of the access of the user equipment, that is, whether the access of the user equipment is trusted non-3GPP access or untrusted non-3GPP access.

The sending unit 1203 sends a message to the PDN-GW, where the message includes a trust relationship information element whose value is "Trusted" or "Untrusted", "Trusted" represents trusted access, and "Untrusted" represents untrusted access. The PDN-GW establishes or updates the data security channel of the S2c tunnel according to the received trust relationship of the access of the user equipment.

Therefore, in this embodiment of the present invention, when a receiving unit receives an authentication and authorization request of an access side, an authentication unit determines a trust relationship of access of a user equipment; and when an S6b interface session of the user equipment already exists, an sending unit sends a message including information about the trust relationship of the access of the user equipment to a PDN-GW, so that the PDN-GW can distinguish an access scenario and complete establishment or update of a data security channel.

Figure 13:
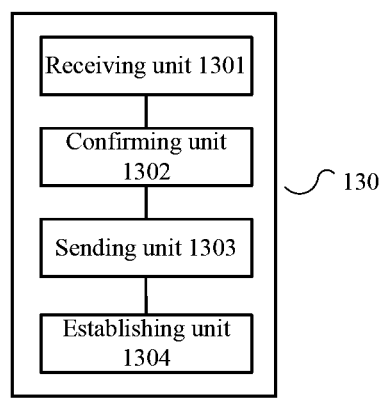
FIG. 13 is a block diagram of a gateway device according to another embodiment of the present invention.

FIG. 13 is a block diagram of a gateway device according to another embodiment of the present invention. A nonrestrictive example of a gateway device 130 in FIG. 13 is a packet data gateway shown in FIG. 3-FIG. 5 and FIG. 7-FIG. 11, including a receiving unit 1301, a confirming unit 1302, a sending unit 1303, and an establishing unit 1304.

The receiving unit 1301 receives a packet data network connection establishment request of a user equipment and receives an authorization response message sent by an authentication and authorization device, where the authorization response message includes information about a trust relationship of access of the user equipment; the confirming unit 1302 confirms, when the receiving unit receives the packet data network connection establishment request, that an S6b session of the user equipment exists or that there already is a security association with the user equipment, and then instructs the sending unit to send an authorization request message to the authentication and authorization device; the sending unit 1303 sends the authorization request message to the authentication and authorization device; and the establishing unit 1304 establishes or updates a data security channel of an S2c tunnel according to the information about the trust relationship in the authorization response message.

In this embodiment, when receiving a packet data network connection establishment request, the gateway device sends an authorization request message to an authentication and authorization device and establishes or updates a data security channel of an S2c tunnel according to a trust relationship of access of a user equipment, where the trust relationship is indicated in an authorization response message of the authentication and authorization device.

The receiving unit 1301 receives the packet data network connection establishment request of the user equipment. When the UE accesses an EPC by using a non-3GPP access network via an S2c interface, the received packet data network connection establishment request is a binding update Binding Update message sent by the UE; when the UE accesses the EPC by using a 3GPP access network via the S2c interface, the received packet data network connection establishment request is a session establishment message sent by an MME, where the session establishment message is sent by the mobility management network element after receiving the packet data network connection request sent by the user equipment.

The confirming unit 1302 confirms whether the S6b session of the currently accessed UE already exists, that is, whether an S6b interface session context of the UE already exists, where the session context includes a session identity Session ID and a user equipment identity. Alternatively, the confirming unit confirms whether a security association has been established with the UE, that is, whether a security context of the UE already exists, where the security context includes a security parameter index SPI and the UE identity. If the S6b interface session of the UE already exists or a security association has been established with the UE, it indicates that the gateway device has previously requested the authentication and authorization device to perform authentication and authorization for the UE. In this case, the sending unit 1303 is instructed to send the authorization request to the authentication and authorization device.

The receiving unit 1301 receives an authorization response message returned by the authentication and authorization device, where the message includes information indicating the trust relationship of the current access, that is, whether the current access is trusted non-3GPP access, untrusted non-3GPP access, or 3GPP access. A specific manner is that the message includes a trust relationship information element whose value is "Trusted", "Untrusted", or "3GPP", which indicates that the current access is trusted non-3GPP access, untrusted non-3GPP access, or 3GPP access.

The establishing unit 1304 establishes or updates the data security channel of the S2c tunnel according to the trust relationship of the access of the user equipment, where the trust relationship is indicated in the received response message. When the message indicates that the access of the user equipment is trusted access, the establishing unit may initiate a procedure for establishing a Child SA with the UE at any time. If the establishing unit receives a Child SA establishment request initiated by the UE, it accepts the request and establishes a Child SA. When the message indicates that the access of the user equipment is untrusted access or 3GPP access, the establishing unit no longer initiates a procedure of establishing a Child SA; and if the establishing unit receives a Child SA establishment request sent by the UE, it rejects the request. A rejection manner may be as follows: "NO_ADDITIONAL_SAS", "NO_Child_SAS", or another cause value is indicated by a cause value in a Notify Payload in a response message for the Child SA establishment request, which represents that Child SA establishment is no longer accepted. If a Child SA already exists between the gateway device and the UE, the establishing unit initiates a Child SA deletion procedure.

Therefore, in this embodiment of the present invention, when the gateway device receives a packet data network connection establishment request, if an S6b interface session of the UE already exists or a security association has been established with the UE, an authorization request is sent to an authentication and authorization device, and a data security channel of an S2c tunnel is established or updated according to a trust relationship of access of the user equipment, where the trust relationship is indicated in a response message of the authentication and authorization device, so that correct establishment or update of the data security channel of the S2c tunnel is ensured when the UE accesses an EPS network via an S2c interface.

Figure 14:
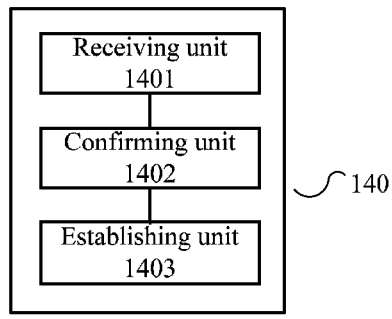
FIG. 14 is a block diagram of a gateway device according to still another embodiment of the present invention.

FIG. 14 is a block diagram of a gateway device according to still another embodiment of the present invention. A nonrestrictive example of a gateway device 140 in FIG. 14 is a packet data gateway shown in FIG. 10 or FIG. 11, including a receiving unit 1401, a confirming unit 1402, and an establishing unit 1403.

The receiving unit 1401 receives a packet data network connection establishment request of a user equipment. The confirming unit 1402 confirms, when the receiving unit receives the packet data network connection establishment request, that an S6b session of the user equipment exists or that there already is a security association with the user equipment, and then determines a trust relationship of access of the user equipment according to wireless access type information in the request. The establishing unit 1403 establishes or updates a data security channel of an S2c tunnel according to the trust relationship, determined by the confirming unit, of the access of the user equipment.

The receiving unit 1401 receives the packet data network connection establishment request of the user equipment, where the packet data network connection establishment request is a session establishment message sent by an MME, and the session establishment message is sent by the mobility management network element after receiving the packet data network connection request sent by the user equipment. The session establishment request includes information such as a UE identity, a PDN type, and a wireless access type. The wireless access type indicates 3GPP access in this case, for example, E-UTRAN and UTRAN. The PDN type indicates a type, such as IPv4, IPv6, or IPv4v6, of an IP address allocated to the UE for the PDN connection. In the case of a handover scenario, the request message further includes a handover indication.

The confirming unit 1402 confirms whether the S6b session of the UE already exists, that is, whether an S6b interface session context of the UE already exists, where the session context includes a session identity Session ID and a user equipment identity. Alternatively, the confirming unit 1402 confirms whether a security association has been established with the UE, that is, whether a security context of the UE already exists, where the security context includes a security parameter index SPI and the UE identity. If the S6b interface session of the UE already exists or a security association has been established with the UE, it indicates that the gateway device has previously requested an authentication and authorization device to perform authentication and authorization for the UE. In this case, the confirming unit determines the trust relationship of the access of the user equipment as 3GPP access according to the wireless access type information in the packet data network connection establishment request received by the receiving unit.

The establishing unit 1403 establishes or updates the data security channel of the S2c tunnel according to the trust relationship, determined by the confirming unit, of the access of the user equipment. The access of the user equipment is 3GPP access, and the establishing unit no longer initiates a Child SA establishment procedure; and if the establishing unit receives a Child SA establishment request sent by the UE, it rejects the request. A rejection manner may be as follows: "NO_ADDITIONAL_SAS", "NO_Child_SAS", or another cause value is indicated by a cause value in a Notify Payload in a response message for the Child SA establishment request, which represents that Child SA establishment is no longer accepted. If a Child SA already exists between the gateway device and the UE, the establishing unit initiates a Child SA deletion procedure.

In this embodiment of the present invention, when a UE accesses an EPC network by using a 3GPP access network via an S2c interface, an MME sends a session establishment request message to a gateway device according to a PDN connection request of the UE; the gateway device determines whether an S6b interface session of the UE already exists or a security association has been established with the UE; if the S6b interface session already exists or a security association has been established with the UE, the gateway device determines a trust relationship of current access of the user equipment according to information in the session establishment request message and establishes or updates a data security channel of an S2c tunnel, where the trust relationship is 3GPP access here. In this way, the PDN-GW can distinguish an access scenario and complete establishment or update of a data security channel.

A communications system according to an embodiment of the present invention may include the authentication and authorization device 120 and/or the gateway device 130.

A communications system according to an embodiment of the present invention may also include the authentication and authorization device 120 and/or the gateway device 140.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, device, and unit, reference may be made to a corresponding process in the foregoing method embodiments, and details are not described herein again.

In the several embodiments provided in the present application, it should be understood that the disclosed system, device, and method may be implemented in other manners. For example, the described device embodiments are merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the devices or units may be implemented in electronic, mechanical, or other forms.

The units described as separate parts may or may not be physically separate, and the parts displayed as units may or may not be physical units, may be located in one position, or may be distributed on a plurality of network units. A part of or all of the units may be selected according to actual needs to achieve the objectives of the solutions of the embodiments.

In addition, functional units in the embodiments of the present invention may be integrated into one processing unit, or each of the units may exist alone physically, or two or more units may be integrated into one unit. The integrated units may be implemented in a form of hardware, or may be implemented in a form of a software functional unit.

When the integrated units are implemented in a form of a software functional unit and sold or used as an independent product, the integrated units may be stored in a computer-readable storage medium. Based on such an understanding, the technical solutions of the present invention essentially, or the part contributing to the prior art, or all or a part of the technical solutions may be implemented in a form of a software product. The computer software product is stored in a storage medium and includes several instructions for instructing a computer device (which may be a personal computer, a server, or a network device) to perform all or a part of the steps of the methods described in the embodiments of the present invention. The foregoing storage medium includes: any mediums that can store program code, such as a USB flash drive, a removable hard disk, a read-only memory (ROM), a random access memory (RAM), a magnetic disk, or an optical disc.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the appended claims.

What is claimed is:

1. A method for processing a data security channel of a tunnel, comprising:
   receiving, by a packet data gateway, a message from an authentication and authorization device when the authentication and authorization device determines that an S6b interface session of a user equipment exists, wherein the message indicates whether a trust relationship of access of the user equipment is trusted or untrusted; and
   establishing or updating, by the packet data gateway, a data security channel of an S2c tunnel according to the message;
   wherein when the message indicates that the trust relationship of the access of the user equipment is trusted, the establishing or updating, by the packet data gateway, the data security channel of the S2c tunnel according to the message comprises at least one of the following:
   initiating, by the packet data gateway, a procedure for establishing a first child security association (Child SA) with the user equipment; and
   accepting a first Child SA establishment request initiated by the user equipment;
   wherein when the message indicates that the trust relationship of the access of the user equipment is untrusted,
   the establishing or updating, by the packet data gateway, the data security channel of the S2c tunnel according to the message comprises at least one of the following:
   rejecting a second child security association (Child SA) establishment request sent by the user equipment; and
   deleting a second Child SA with the user equipment.

2. The method according to claim 1, wherein the message carries a trust relationship information element, and a value of the trust relationship information element is trusted or untrusted, which indicates that the trust relationship of the access of the user equipment is trusted or untrusted, respectively.

3. The method according to claim 1, wherein the rejecting the second Child SA establishment request sent by the user equipment comprises:
   indicating, in a response message for the second Child SA establishment request, that the second Child SA establishment request sent by the user equipment is not accepted.

4. The method according to claim 1, wherein the trust relationship of the access of the user equipment is determined by the authentication and authorization device according to parameters comprising one or more of the following: an access network identifier, a visited network identity, an access type, and a security mechanism that is used in an access network.

5. An apparatus for processing a data security channel of a tunnel, comprising:

a receiver, configured to receive a message from an authentication and authorization device when the authentication and authorization device determines that an S6b interface session of a user equipment exists, wherein the message is used to indicate whether a trust relationship of access of a user equipment is trusted or untrusted; and a processor, configured to establish or update a data security channel of an S2c tunnel according to the message;

wherein when the message is used to indicate that the trust relationship of the access of the user equipment is trusted, the processor is configured to implement at least one of the following:

initiating a procedure for establishing a first child security association (Child SA) with the user equipment; and accepting a first Child SA establishment request initiated by the user equipment;

wherein when the message is used to indicate that the trust relationship of the access of the user equipment is untrusted, the processor is configured to implement at least one of the following:

rejecting a second child security association (Child SA) establishment request sent by the user equipment; and deleting a second Child SA with the user equipment.

6. The apparatus according to claim 5, wherein the message carries a trust relationship information element, and a value of the trust relationship information element is trusted or untrusted, which indicates that the trust relationship of the access of the user equipment is trusted or untrusted, respectively.

7. The apparatus according to claim 5, wherein when the processor is configured to reject the second Child SA establishment request sent by the user equipment, the processor is further configured to indicate, in a response message for the second Child SA establishment request, that the second Child SA establishment request sent by the user equipment is not accepted.

8. The apparatus according to claim 5, wherein the trust relationship is determined by the authentication and authorization device according to parameters comprising one or more of the following: an access network identifier, a visited network identity, an access type, and a security mechanism that is used in an access network.

9. A method for processing a data security channel of a tunnel, comprising:

receiving, by an authentication and authorization device, an authentication and authorization request of an access side;

determining, by the authentication and authorization device, whether a trust relationship of access of a user equipment is trusted or untrusted according to the authentication and authorization request;

when the authentication and authorization device determines that an S6b interface session of the user equipment exists, sending, by the authentication and authorization device, a message to a packet data gateway for the packet data gateway to establish or update a data security channel of an S2c tunnel according to the message, wherein the message indicates whether the trust relationship is trusted or untrusted;

wherein when the message indicates that the trust relationship of the access of the user equipment is trusted, the sending a message to a packet data gateway for the packet data gateway to establish or update a data security channel of an S2c tunnel according to the message comprises at least one of the following:

sending a message to a packet data gateway for the packet data gateway to initiate a procedure for establishing a first child security association (Child SA) with the user equipment; and sending a message to a packet data gateway for the packet data gateway to accept a first Child SA establishment request initiated by the user equipment;

wherein when the message indicates that the trust relationship of the access of the user equipment is untrusted, the sending a message to a packet data gateway for the packet data gateway to establish or update a data security channel of an S2c tunnel according to the message comprises at least one of the following:

sending a message to a packet data gateway for the packet data gateway to reject a second child security association (Child SA) establishment request sent by the user equipment; and sending a message to a packet data gateway for the packet data gateway to delete a second Child SA with the user equipment.

10. The method according to claim 9, wherein the access side is at least one of the following: a trusted non-3GPP access network, an untrusted non-3GPP access network, and an evolved packet data gateway.

11. The method according to claim 9, wherein that the authentication and authorization device determines that an S6b interface session of the user equipment exists comprises:

the authentication and authorization device determines that a context of the S6b interface session of the user equipment exists.

12. The method according to claim 9, wherein the message carries a trust relationship information element, and a value of the trust relationship information element is trusted or untrusted, which indicates that the trust relationship of the access of the user equipment is trusted or untrusted, respectively.

13. An authentication and authorization device, comprising a receiver, a processor and a transmitter; wherein the receiver is configured to receive an authentication and authorization request of an access side;

the processor is configured to determine whether a trust relationship of access of a user equipment is trusted or untrusted, according to the authentication and authorization request, and is configured to determine that an S6b session of the user equipment exists; and the transmitter is configured to send, when the processor determines that the S6b session of the user equipment exists, a message to a packet data gateway for the packet data gateway to establish or update a data security channel of an S2c tunnel according to the message, wherein the message is used to indicate whether the trust relationship is trusted or untrusted;

wherein when the message indicates that the trust relationship of the access of the user equipment is trusted, the transmitter is configured to send a message to a packet data gateway for the packet data gateway to establish or update a data security channel of an S2c tunnel according to the message comprises at least one of the following:

the transmitter is configured to send a message to a packet data gateway for the packet data gateway to initiate a procedure for establishing a first child security association (Child SA) with the user equipment; and the transmitter is configured to send a message to a packet data gateway for the packet data gateway to accept a first Child SA establishment request initiated by the equipment;

wherein when the message indicates that the trust relationship of the access of the user equipment is untrusted, the transmitter is configured to send a message to a packet data gateway for the packet data gateway to establish or update a data security channel of an S2c tunnel according to the message comprises at least one of the following:

the transmitter is configured to send a message to a packet data gateway for the packet data gateway to reject a second child security association (Child SA) establishment request sent by the user equipment; and the transmitter is configured to send a message to a packet data gateway for the packet data gateway to delete a second Child SA with the user equipment.

14. The authentication and authorization device according to claim 13, wherein the access side is at least one of the following: a trusted non-3GPP access network, an untrusted non-3GPP access network, and an evolved packet data gateway.

15. The authentication and authorization device according to claim 13, wherein the processor is further configured to determine that a context of the S6b interface session of the user equipment exists.

16. The authentication and authorization device according to claim 13, wherein the message carries a trust relationship information element, and a value of the trust relationship information element is trusted or untrusted, which indicates that the trust relationship of the access of the user equipment is trusted or untrusted, respectively.

* * * * *

UNITED STATES PATENT AND TRADEMARK OFFICE
CERTIFICATE OF CORRECTION

PATENT NO. : 9,800,563 B2
APPLICATION NO. : 14/269965
DATED : October 24, 2017
INVENTOR(S) : Li et al.

It is certified that error appears in the above-identified patent and that said Letters Patent is hereby corrected as shown below:

In the Claims

Column 27, Line 6, Claim 13 "equipment" should read -- user equipment --.

Signed and Sealed this
Twenty-fourth Day of April, 2018

Andrei Iancu
*Director of the United States Patent and Trademark Office*